(12) United States Patent
Day et al.

(10) Patent No.: US 6,414,337 B1
(45) Date of Patent: Jul. 2, 2002

(54) APERTURE FRAME FOR LIQUID CRYSTAL DISPLAY DEVICE

(75) Inventors: Kevin Day; Andrew R. Slater, both of Phoenix, AZ (US)

(73) Assignee: Three-Five Systems, Inc., Tempe, AZ (US)

( * ) Notice: Subject to any disclaimer, the term of this patent is extended or adjusted under 35 U.S.C. 154(b) by 0 days.

(21) Appl. No.: 09/709,903

(22) Filed: Nov. 10, 2000

(51) Int. Cl.[7] .................. H01L 29/04; H01L 31/036
(52) U.S. Cl. ...................... 257/72; 349/44; 349/111
(58) Field of Search .................... 257/72; 438/30; 345/87; 349/58, 113, 147, 44, 110, 111

(56) References Cited

U.S. PATENT DOCUMENTS 6,300,926 B1 * 10/2001 Yoneya et al. ............... 345/87
6,320,204 B1 * 11/2001 Hirabayashi ................ 257/71

* cited by examiner

Primary Examiner—Michael J. Sherry
Assistant Examiner—Asok Kumar Saricar
(74) Attorney, Agent, or Firm—Baker Botts LLP

(57) ABSTRACT

Liquid crystal display devices having display screens with an improved black frame is provided. The microdisplay of the LCD is formed of a matrix of pixels disposed on the top surface of a silicon substrate, a layer of glass, and a layer of a reflective metal, preferably aluminum, which is disposed between the silicon substrate and layer of glass. The layer of reflective metal has a pattern, which forms a frame around the matrix of pixels, and is involved in generating the black frame when viewed by the user on the display screen. The reflective material functions to reflect light back to the light generating source, and thus displays a pure black image to the user. In another embodiment, a layer of reflective metal, preferably black chromium, patterned to form a frame around the matrix of pixels, is disposed on the top surface of the glass. The reflective metal layer on top of the glass may be used either in place of, or in addition to, the reflective metal layer on the bottom of the glass to generate the improved black frame.

22 Claims, 11 Drawing Sheets

APERTURE FRAME FOR LIQUID CRYSTAL DISPLAY DEVICE

FIELD OF THE INVENTION

The present invention relates generally to liquid crystal display devices, such as a microdisplays and more particularly to an apparatus and methods for generating an accurate, visually appealing black frame around the image being displayed on either a display screen or for a near to the eye or binocular application microdisplays.

BACKGROUND OF THE INVENTION

Microdisplays are a type of liquid crystal display (LCD). LCDs are commonly used in portable televisions, portable computers, and cellular phones to display information to the user. LCDs act in effect as a light valve, i.e., they allow transmission of light in one state and block the transmission of light in a second state. When used as a high resolution information display, as in the application of the present invention, the LCDs are typically arranged in a dot-matrix configuration with independently addressable pixels. Each individual pixel is controlled to selectively modulate light from a backlight (transmission mode), from a reflector (reflective mode), or from a combination of the two (transflective mode). The matrix of pixels is laid out on a semiconductor substrate or die, which is produced from a semiconductor wafer or other suitable substrate such as a silicon wafer. Multiple die can be generated from a single wafer or substrate.

Typically, the image generating portion of the microdisplay, is constructed by bonding a piece of glass or transparent material G to an electrical circuit fabricated on a semiconductor or other suitable substrate chip S, as illustrated in FIG. 1. The glass or transparent material G is held to the silicon S by a perimeter seal PS, which is generally formed of an epoxy or other similar sealant-type material. Liquid crystal LC fills the region between the glass or transparent material G and semiconductor substrate or silicon S, and inside the perimeter seal PS, as also shown in FIG. 1. The region inside of the perimeter seal is generally considered to be available as the viewing or active area of the display, i.e., this is the area where the pixels and liquid crystal are located.

A drawback of this construction is that when an image is displayed upon a screen or viewed directly, from the microdisplay; the perimeter seal PS, and any space between the inside of the perimeter seal PS and outer perimeter of pixels, are visible. In a projected or viewed image, this region of the display is not visually appealing. Another drawback of this construction is that stray light bounces off of the perimeter seal PS surfaces and surfaces adjacent to the perimeter seal PS. This can lead to a reduction in the contrast ratio of the display, which is undesirable.

In one solution to the above described problems in the prior art, a black frame BF is placed on the top surface of the glass G. In one embodiment of this solution, the frame is formed by cutting a piece of metal coated black into the desired pattern. The metal frame is then adhered to the top surface of the glass G. Alternatively, the frame is formed by depositing a black ink on the top surface of the glass G in the desired pattern. The black color of the coating or ink absorbs stray light SL, and thus prevents the image of the perimeter seal PS from being visible, as shown in FIG. 2. Any other light L that is directed onto a pixel P will be reflected back. Thus, as long as the opening in the frame is made so that the perimeter seal PS (and any other aspects of the image that are not desired to be projected) is protected from incident light, the protected image will be masked.

There are, however, a number of drawbacks to the Black Frame and Black Ink solutions. One is the parallax of incoming light. Another is Snell's Law. Parallax refers to the phenomenon where lightwaves which enter the glass are not perpendicular to the surfaces of the glass. These light rays strike the interior and exterior faces of the glass and the pixels on the Fabricated Semiconductor at an angle and are reflected back out of the glass at a complementary angle.

With the phenomenon described by Snell's Law, light waves are bent as they travel through glass to air and glass to LC fluid boundaries, in each direction, into and out of the glass.

Because light rays must travel through the thickness of the glass G before striking the pixel array, the impacts of parallax and Snell's Law must be accounted for. FIG. 3 illustrates these impacts as it travels through the display.

The primary aspect of the parallax problem results from the fact that there is some finite distance, D between the edge of the black frame BF and the first illuminated pixel P due to the distance the light must travel through the glass G. See FIG. 3. By calculating this distance, it is possible to develop an opening size in the black frame BF that will allow the appropriate region of the display to be illuminated, so that the perimeter seal PS is covered, but the pixels are left open. However, if the angle of incidence of the outermost light rays varies, which it often does because of the incident angle and f# of each different lens system, the region of the display that is illuminated changes.

Two different prior art solutions were developed to deal with this latter problem. One involves creating a custom black frame opening and location for each different optical lens system. A drawback of this solution is that it requires customization of what is an otherwise standard product, which increases product cost and complexity. Another solution to this latter problem, involves increasing the number of pixels on the silicon. In this arrangement, "unused" pixels adjacent to the perimeter seal or black frame are driven black. A drawback of this solution is that it reduces the number of displays that can be produced from each wafer because each silicon die is increased in size. Another drawback of this latter solution is that "black" pixels BP are not truly black. This is because of the contrast ratio of the display. Thus, with this latter solution, a gray region GR is projected between the black frame BF and the projected pixels PP. This effect is illustrated in FIG. 4.

The major disadvantage of the solution employing a black frame or printing black ink on the top surface of the glass is that the tolerances in the size of the opening of the black frame. The positioning of the black frame poses additional problems of requiring 20 or more additional pixels on each side of the display to compensate for these inaccuracies. These additional pixels not only decrease the yield from each wafer, but they also create the gray ring to be displayed in the projected or observed images described above, depending upon the microdisplay application.

Yet another disadvantage of this solution is that because the black frame is outside of the focal plane of the optics system (the focal plane is at the surface of the silicon die), the edges are slightly blurry.

Another problem with using black frames is thermal management. The black frame absorbs energy, and thus becomes hot. Removing the energy, particularly in high energy lighting projection systems, using microdisplays, without causing it to damage the liquid crystal, is problematic.

Still another drawback of using black frames, applied on the top surface of the glass, is that manufacturing such devices is expensive. Each frame has to be added to the microdisplay one at a time. Because alignment tolerances are critical, this step thus requires a lot of time and specialized equipment.

Another aspect of microdisplay devices relevant to the present invention relates to the connection of what is known as the VCOM or ITO signal. This is a voltage that exists on a thin layer of transparent metal, ITO (Indium Tin Oxide), which is coated on the inside surface of the glass G. This voltage sets up the potential difference across the liquid crystal. It provides the reference voltage for the pixel voltage on the silicon S. It is important that the connections to the ITO be of low resistance so as to provide low power consumption and high contrast displays.

Typically, connectivity to the ITO layer I on the inside surface of the glass is accomplished by employing conductive solders or epoxies E, which connect to the circuit (usually by a flex circuit or printed circuit board) C to the ITO layer I on the exposed ledge of the glass, as shown in FIG. 5. The resistance of the electrical path going through the conductive epoxy E and directly into the ITO layer I is relatively high. This is because conductive epoxies have marginal electrical bond capabilities with the ITO layer I. The resistance of ITO coatings varies with the type and thickness, but a general trend is that optically favorable ITO coatings tend to have higher resistance values. As microdisplays begin using these optically favorable coatings, the contact resistance will increase further. This increased contact resistance requires higher driving voltages for the VCOM signal, in turn leading to more expensive electronics and/or shortened battery lives for hand-held devices. It is important that any solution, which is proposed for improving the generation of the black frame of the visual display panel, not increase the contact resistance between the ITO layer I and the circuit interconnect C.

SUMMARY OF THE INVENTION

The present invention is directed to overcoming, or at least minimizing the drawbacks of the prior art liquid crystal display devices.

In one embodiment of the present invention, a LCD having an improved black frame is provided. The microdisplay of the LCD according to the present invention has a matrix of pixels disposed on the top surface of a silicon substrate. It also includes a layer of transparent material, preferably glass, having a top surface and a bottom surface. The bottom surface of the layer of transparent material is disposed adjacent to the top surface of the silicon substrate. A seal is disposed between the silicon substrate and the layer of transparent material. The seal is arranged to form a perimeter around the matrix of pixels. An annulus, is formed by a region bounded by the top surface of the silicon substrate, the bottom surface of the layer of transparent material, and the area inside of the perimeter formed by the seal. The annulus is filled with a liquid crystal. The liquid crystal which when activated (exposed to a voltage potential), twists, changing the polarity of any light directed on it.

This embodiment of the present invention further includes a layer of reflective material positioned between the top surface of the semiconductor substrate or back plane and the bottom surface of the layer of transparent material. The layer of reflective material is patterned to form a frame around the matrix of pixels. The layer of reflective material preferably includes a metal or metal alloys, e.g., aluminum, platinum, chromium, copper, silver or any other metal or metal alloys having a reflectivity of at least 97%. This embodiment of the present invention also includes a layer of conductive material that is disposed on the bottom surface of the layer of transparent material. The layer of reflective material is preferably disposed on the layer of conductive material. This embodiment further includes a plurality of transparent beads disposed in the annulus. The plurality of beads act as spacers to prevent the top surface of the semiconductor substrate from coming in contact with the layer of conductive material on the bottom of the glass or transparent material.

In another embodiment of the present invention, a light absorptive layer is placed over the top surface of the layer of transparent material. The light absorptive layer in this embodiment is also patterned to form a frame around the matrix of pixels. Preferably, this light absorptive layer is comprised of a structure or material with black chromium, ink or other suitable coating. In yet another embodiment of the present invention, a light absorptive layer is placed on the top surface and the reflective layer is placed on the bottom surface of the transparent material.

The present invention differs from the prior art solutions in a number of respects. First, in the preferred embodiment, it places the frame at the surface of the liquid crystal, which is at the focal plane of the optical system. This eliminates parallax, which means that a single display can be created that will work in many different optical systems. It also reduces the number of required pixels, and allows the die size to be minimized, which decreases the cost of the display. Furthermore, because the reflective frame utilized in the present invention reflects light rather than absorbs it, it does not generate heat in the device, thus eliminating thermal management as an issue.

Furthermore, with the present invention, since the frame is placed on the inside surface of the glass, it enables a photolithography process to be used to create the frame. This allows for much tighter tolerances than can be attained with a metal or pad printed frame, which in turn can lead to a smaller die size. Also, during manufacturing, the masks used in the present invention to form the reflective pattern used in generating the black frame can be placed on multiple displays at a time. A single sheet of glass can be used to make 50 to 100 displays screens. This has a significant improvement on throughput and thus decreases manufacturing costs.

BRIEF DESCRIPTION OF THE DRAWINGS

Other objects and advantages of the invention will become apparent upon reading the following detailed description and upon reference to the drawings in which.

DETAILED DESCRIPTION OF THE PREFERRED EMBODIMENTS

Figure 1:
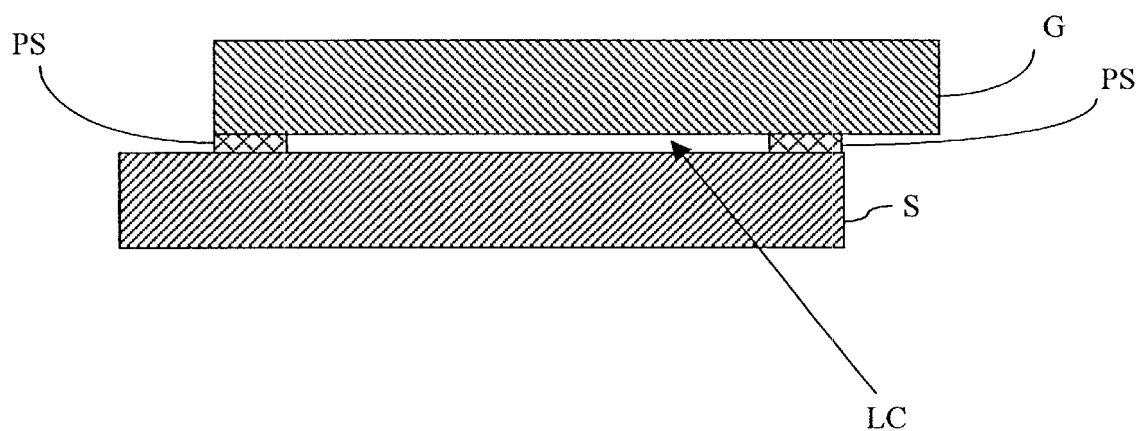
FIG. 1 is a cross-sectional view of a prior art microdisplay device illustrating the basic components of the display apparatus.
Figure 2:
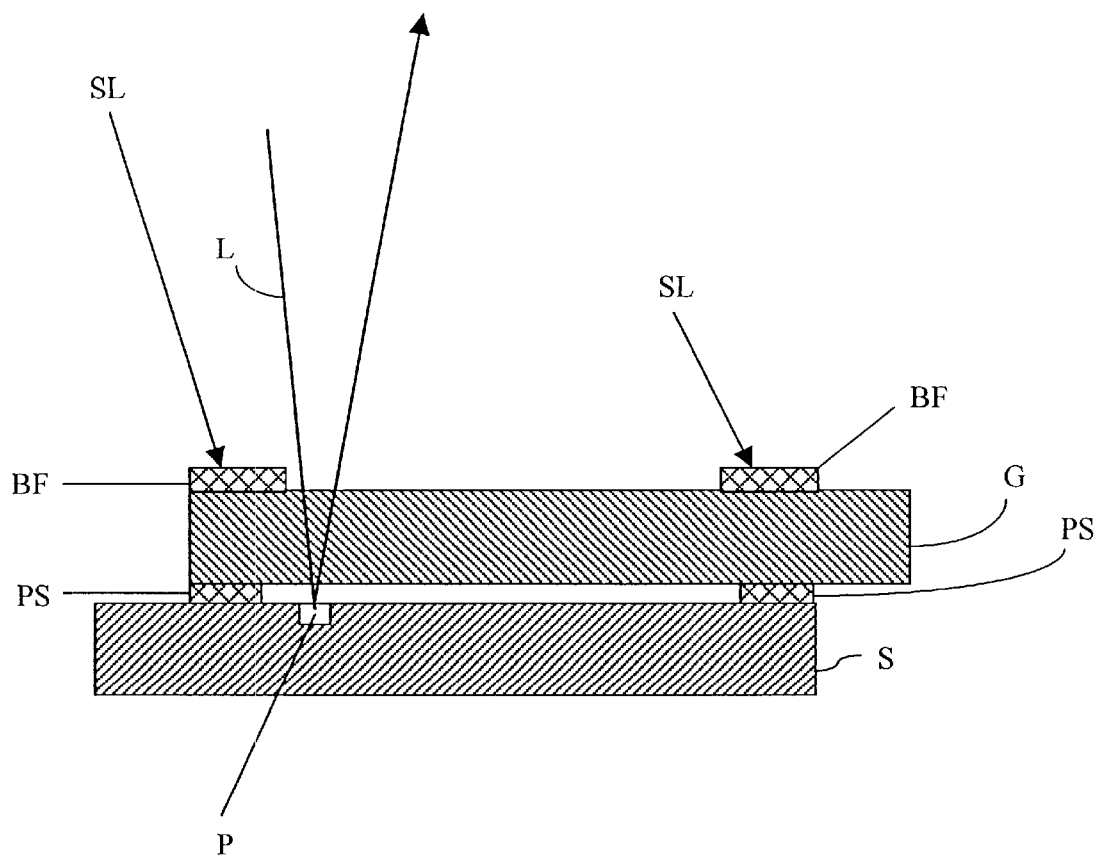
FIG. 2 is a cross-sectional view of the prior art microdisplay device shown in FIG. 1 with a black frame, which is disposed on the top surface of the glass component of the display apparatus.
Figure 3:
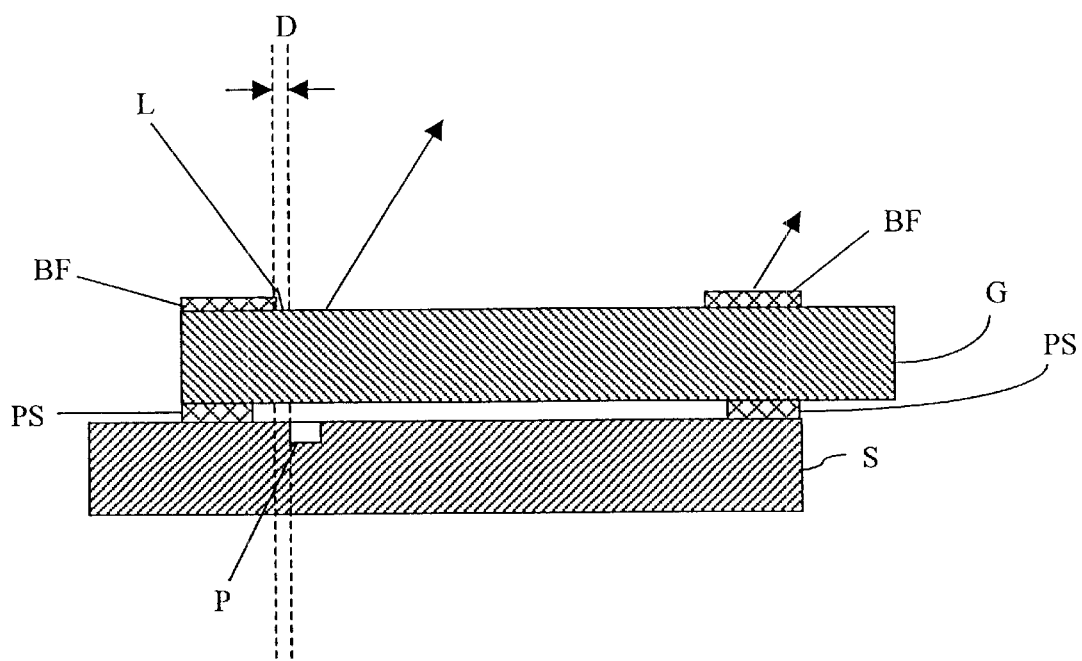
FIG. 3 is a cross-sectional view of the prior art microdisplay device shown in FIG. 2 illustrating the phenomena of parallax.
Figure 4:
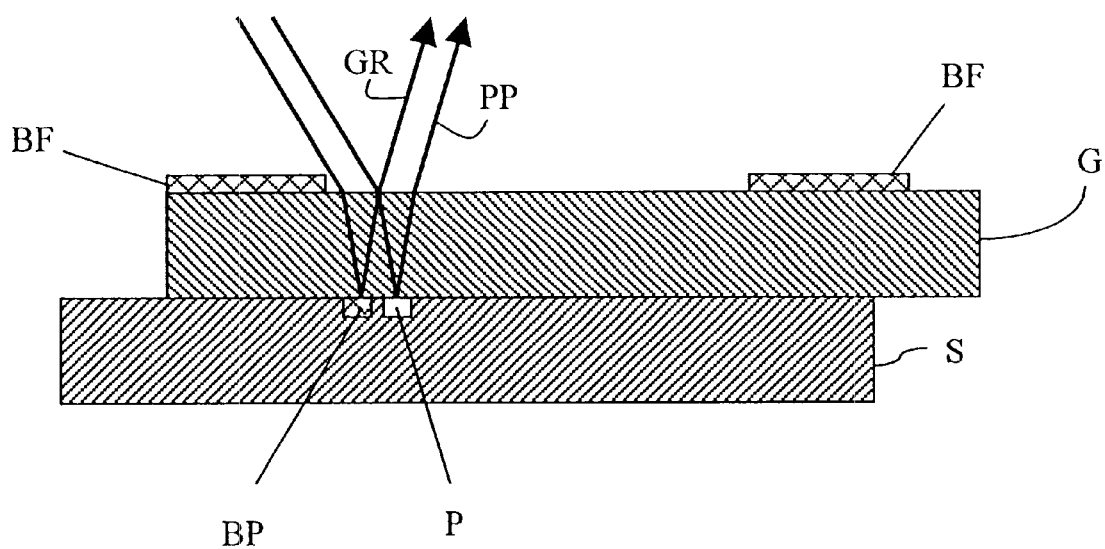
FIG. 4 is a cross-sectional view of the prior art microdisplay device shown in FIG. 3 with an additional pixel driven black.
Figure 5:
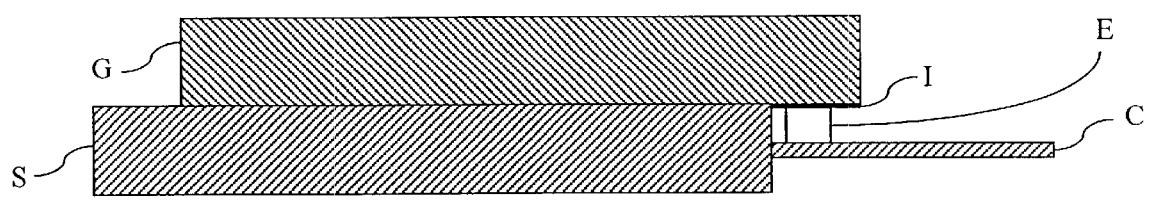
FIG. 5 is a cross-sectional view of a prior art microdisplay device illustrating how a conductive epoxy connects a flex circuit or PCB board to the ITO conductive metal.
Figure 6:
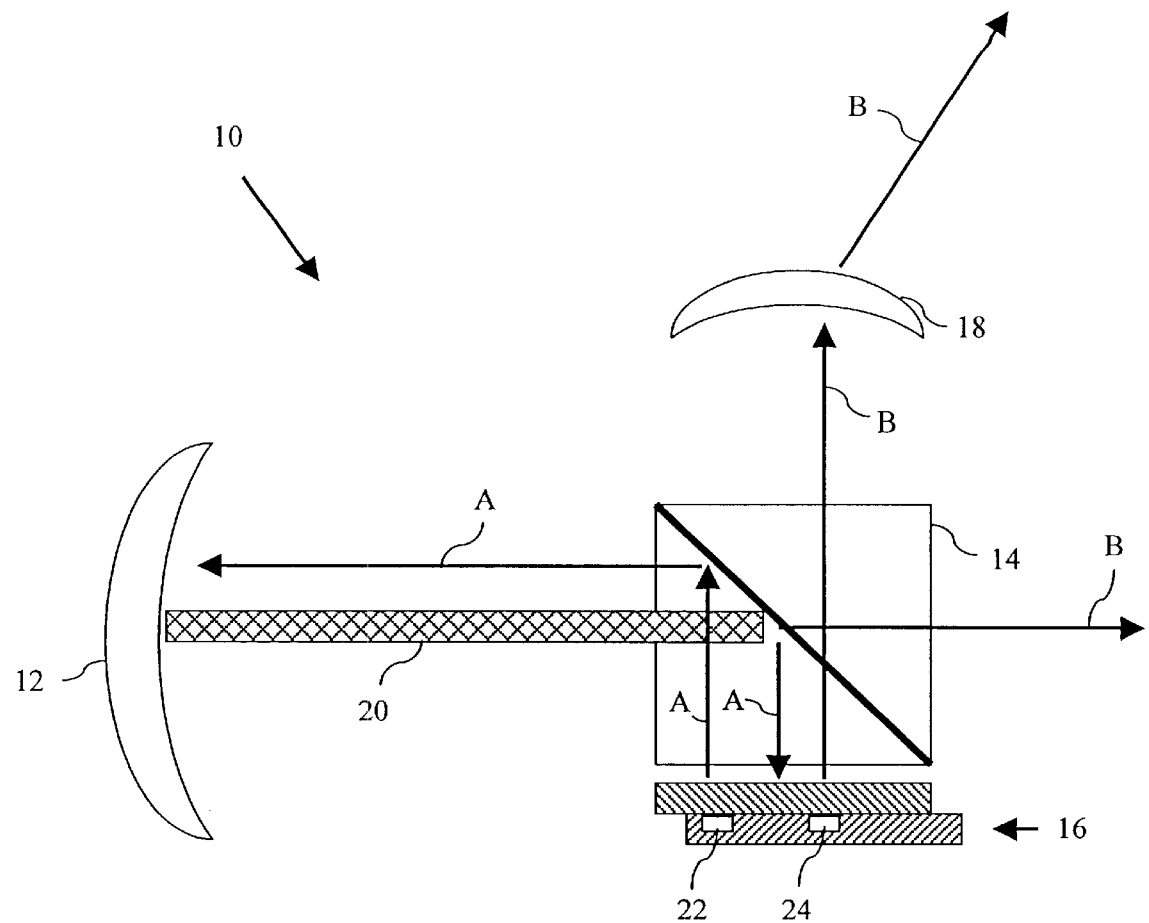
FIG. 6 is a diagram example of the basic components of a projection scheme using a liquid crystal display device known in the art.

Turning to the drawings, the preferred embodiments of the present invention will now be described. Referring first to FIG. 6, the components of a known monochrome projection system will be discussed as way of background and incorporation into the present invention. The monochrome projection system will be referred to generally by reference numeral 10. The system, 10, includes a light source 12, a beam splitter cube 14, a microdisplay 16, and a projection lens 18.

The light source 12 is a conventional Halogen Tungsten lamp that projects a light beam/reflector 20, having both types of polarization, i.e., Type-A and Type-B Polarization, onto beam splitter cube 14. The beam splitter cube 14 reflects light of one type of polarization, e.g., Type-A, and transmits light of the other type of polarization, e.g., Type-B. Light of Type-A polarization is identified with the character "A" in FIG. 6, and light of Type-B polarization is identified with the character "B." Pixel 22 is shown in FIG. 6 as not being selected, and thus reflects light of Type-A polarization, without changing its polarization, back to the light source 12. Pixel 24 is shown in FIG. 6 as being selected, and thus changes the polarization of the Type-A light to Type-B. Pixel 24 reflects the light now of Type B polarization into the beam splitter cube 14, which transmits it to the projection lens 18, which in turn transmits it to the display screen (not shown).

Figure 7:
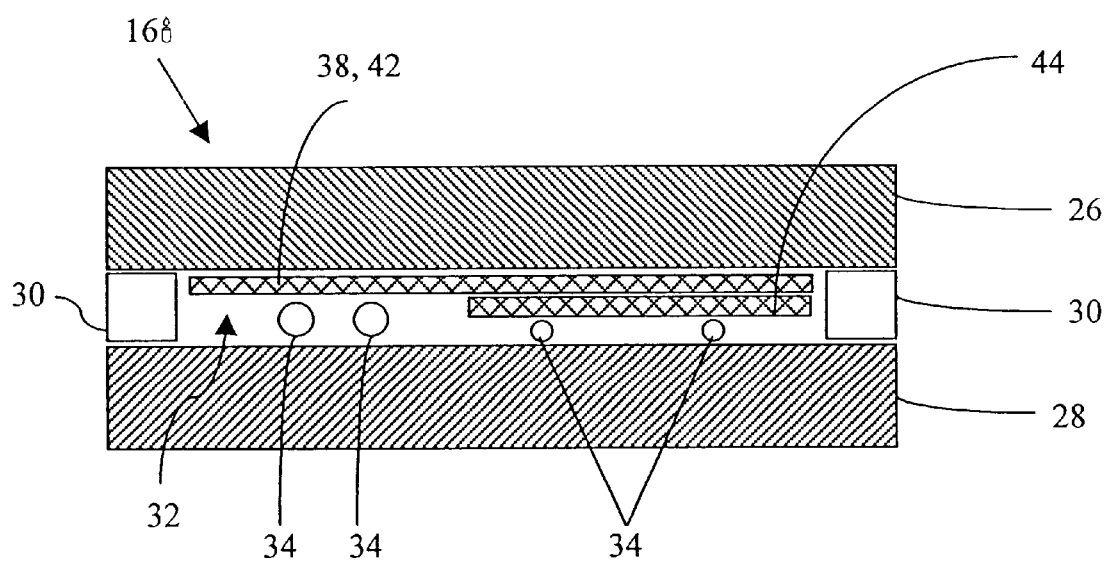
FIG. 7 is cross-sectional view of a microdisplay device according to the present invention.

The microdisplay device 16', which generates an improved black frame for projection onto the display screen according to the present invention, will now be described initially with reference to FIG. 7. The microdisplay device 16' is formed of a layer of glass 26, which is preferably approximately 0.5 mm to 1.1 mm in thickness. Although smaller geometric dimensions may be possible as microdisplay devices reduce in size over time. Furthermore, as those of ordinary skill in the art will appreciate, the layer of glass 26 may be formed of another transparent material.

The microdisplay 16' also includes a semiconductor or silicon substrate layer 28. An integrated circuit (not shown) is formed on the top surface of the silicon substrate layer 28, using deposition and etching techniques well know in the art. The integrated circuit contains a matrix of electrodes, which form pixels used in generating the visual display. When a particular location on the display screen is desired to be illuminated, an individual pixel in the integrated circuit corresponding to that location is activated (selected) using known addressing techniques.

A sealant 30, preferably formed of an epoxy material, is placed along the outer edge of the layer of glass 26 and silicon substrate layer 28. The sealant 30 forms a seal between the layer of glass 26 and silicon substrate layer 28, and around the matrix of pixels. The region bounded by the layer of glass 26, the silicon substrate layer 28, and perimeter sealant forms an annulus 32, which is approximately 3.7 microns thick. The annulus 32 is filled with liquid crystal. A plurality of beads 34 are placed between layer of glass 26 and silicon substrate layer 28 to maintain the spacing between these two layers. The beads 34 are preferably formed of a glass or polysilicon material and are preferably between 3 and 4 microns in thickness.

Figure 8:
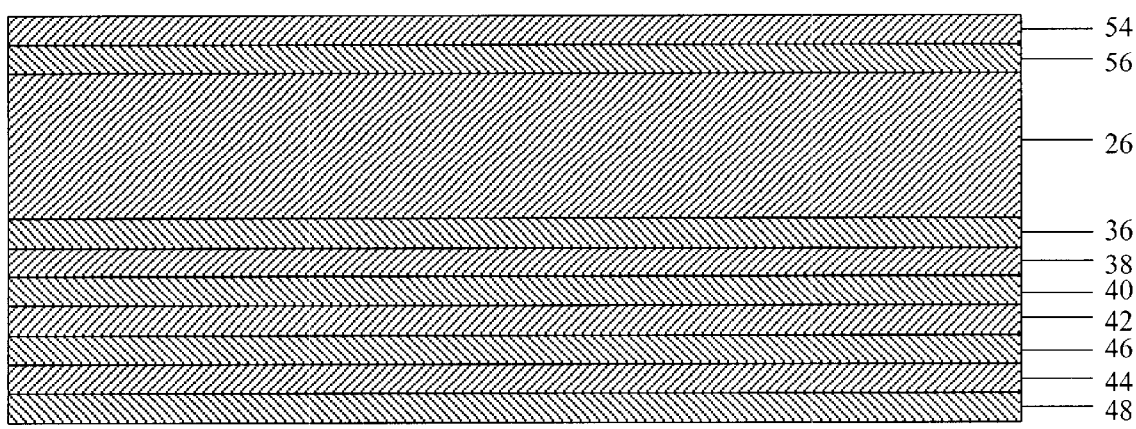
FIG. 8 is a cross-sectional view of the glass layer and associated ITO conductive layer(s) and reflective layer(s) employed in the microdisplay device shown in FIG. 7.

The details of the layers of material formed on the layer of glass 26, which make up the ITO conductive layer, and the reflective layer(s) used in generating the improved black frame according to the present invention, will now be discussed with reference to FIG. 8. First, the ITO conductive layer is formed by depositing a polysilicon layer 36, preferably an $SiO_2$ layer, on the bottom surface of the glass layer 26. A conductive metal layer 38, preferably a transparent metal such as Indium Tin Oxide (ITO), is then deposited over the first polysilicon layer 36. In one alternate embodiment, a second polysilicon layer 40, preferably an $SiO_2$ layer, is deposited over the conductive metal layer 38, and a second conductive metal layer 42, preferably formed of ITO, is deposited over the second polysilicon layer to form a two-layered sandwich of polysilicon and conductive metal material. The polysilicon layers 36 and 40 and the conductive metal layers 38 and 42 are deposited on the bottom surface of the glass layer 26 using known deposition techniques. These layers of material are also deposited in thicknesses well known in the art.

The conductive metal layers 38 and 42 form in effect one plate of a pair of plates in a capacitor. Each electrode of each pixel and the associated adjacent region on the conductive layers form a pixel capacitor. The conductive metal layers 38 and 42 provide the reference voltage for the voltage applied to the individual electrodes forming the pixels. They therefore set up a potential difference across the liquid crystal, which in turn twists in response to the potential difference.

Next, a reflective layer 44 is formed. In particular, the reflective layer 44 is deposited over the ITO layer. The reflective layer 44 preferably comprises aluminum, but may comprise other reflective metals, such as platinum, copper, and silver. Any metal that reflects 97% or more of the light directed on it could be used. The reflective layer 44 is preferably deposited to a thickness of approximately 500 to 1600 angstroms. The reflective layer 44 can be applied to the conductive metal layer 42 by any one of a number of processes, including, e.g., a sputtering process, a PVD, Physical Vapor Deposition process, a spin coating process, a lithographic process, a photo-etch lift off process, laser cutting or laser scribed process, or an electrodeposition or electroplating process. Preferably, a photolithography or photo-etch lift off process is used. In an alternate embodiment of the present invention, an additional layer of polysilicon material 46, e.g., $SiO_2$, may be deposited between the conductive metal layer 42 and the reflective layer 44, and another layer of polysilicon material 48, again, e.g., $SiO_2$, may be deposited over the reflective layer 44. Encapsulating the reflective layer 44 in a sandwich of polysilicon layers has the benefit of preventing the phenomena known as metal wisker growth.

Figure 9:
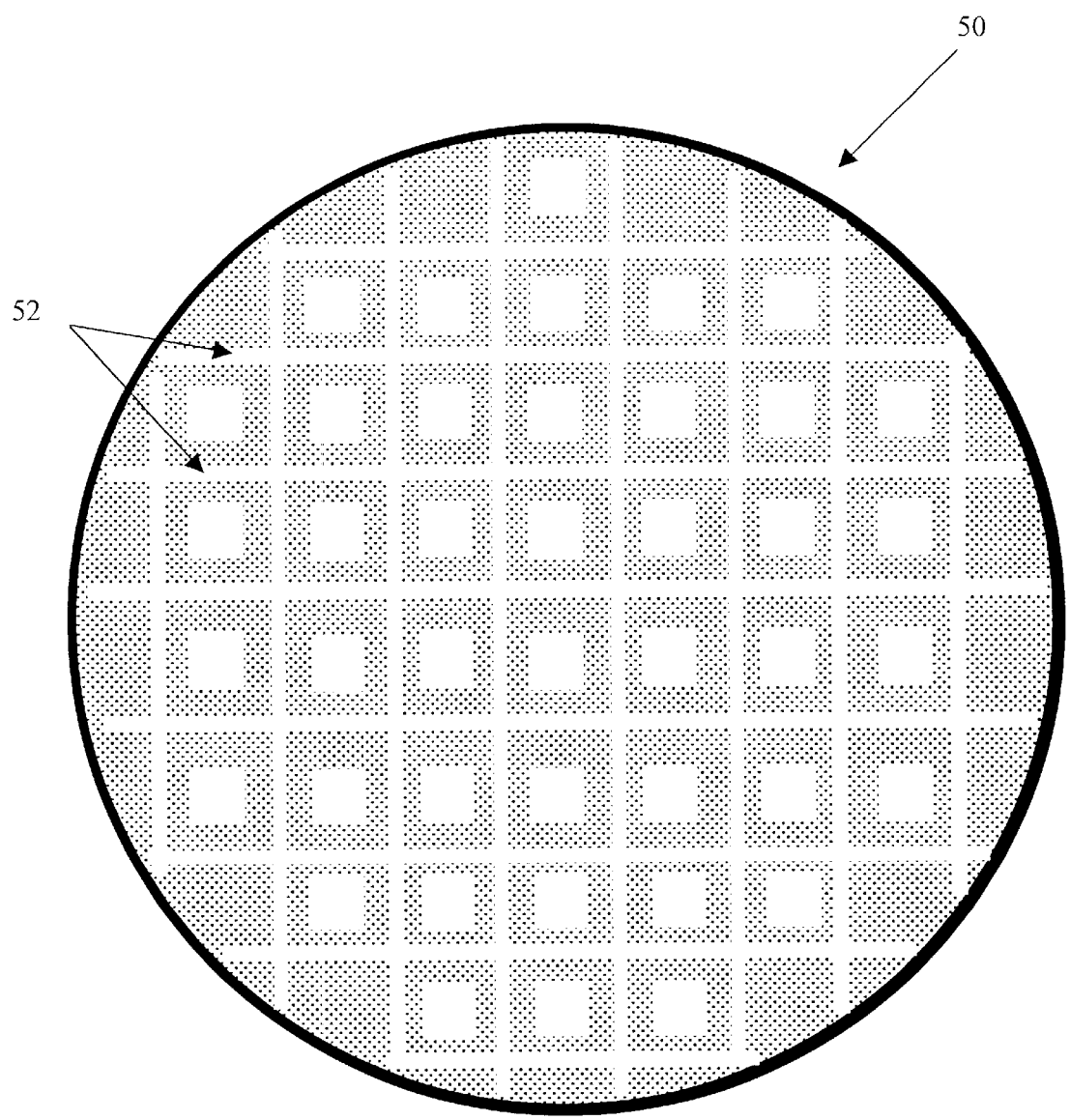
FIG. 9 is a diagram of the pattern of the mask used in forming the reflective or absorptive layer(s) used in generating the improved black frame that is projected on the display screen of a LCD device according to the present invention.

It is necessary that the reflective layer 44 not cover the matrix of pixels. Accordingly, the reflective material deposited over the portion of the conductive metal layer(s) 38, 42 adjacent to the pixels, should be removed, preferably by an etching process. A mask 50 preferably having the pattern shown in FIG. 9 should be used for this purpose. However, as those of ordinary skill in the art will appreciate a mask having other patterns may be used. Preferably, the mask 50 has a grid 52 of the pattern shown in FIG. 9. The grid 52 is provided for aligning the glass 26 on the silicon wafer used in making the individual die, which forms the silicon substrate 28. It is also important that any non-conductive layers deposited on the conductive metal layers 38 and 42 be etched away in the region adjacent to the cross-over epoxy, which connects the flex circuit or PCB to the conductive ITO layer. This is necessary to minimize resistance.

The reflective layer 44 reflects any light that strikes the layer. Such light is reflected onto the bean splitter cube 14, which in turn reflects it back to the light source 12. The area where the reflective layer 44 is deposited is thus projected onto the display screen as an area of complete darkness. It appears to the viewer as a black frame.

Figure 10:
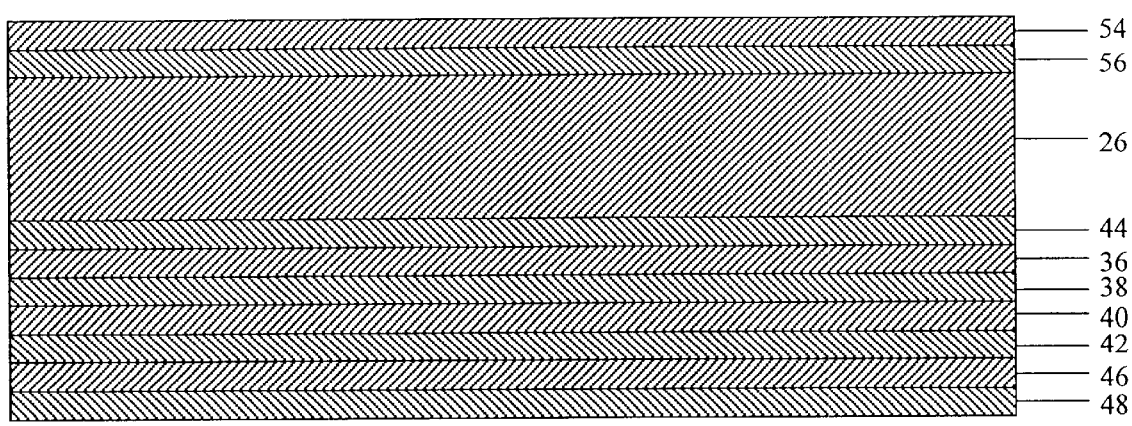
FIG. 10 is a cross-sectional view of another embodiment of the glass layer and associated ITO conductive layer(s) and reflective layer(s) employed in the microdisplay device shown in FIG. 7.

In an alternate embodiment, the reflective layer 44 is placed between the glass layer 26 and the first polysilicon layer 36, as shown in FIG. 10. This embodiment is preferred because it is a configuration that avoids having the aluminum metal layer 44 come in contact with the ITO layer 42. In some cases, the Aluminum metal layer can have an adverse, electrolytic reaction with the ITO layer. A form of corrosion would develop, rendering the ITO layer electrically nonfunctional. It may also worsen the optical characteristics if it occurs inside the aperture, and hence be displayed as a rough, multi-colored inside edge. If the Aluminum metal layer is deposited directly on the glass layer, prior to the deposition of the first $SiO_2$ layer, then the first $SiO_2$ layer will seal the Aluminum metal away from the first layer of ITO.

Figure 11:
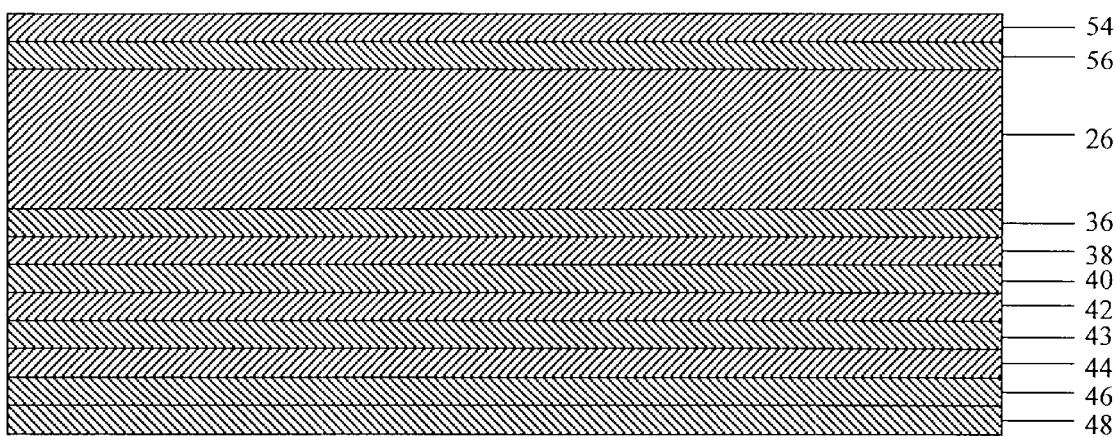
FIG. 11 is a cross-sectional view of yet another embodiment of the glass layer and associated ITO conductive layer(s) and reflective layer(s) employed in the microdisplay shown in FIG. 10.

In yet another embodiment, a barrier metal layer 43 may be formed between the ITO layer 42 and the aluminum reflective layer 44, as show in FIG. 11. The barrier metal layer 43 is preferably Tungsten, Titanium, Chrome or other similar alloy. The advantage of using a barrier metal is that it is a metal or metal alloy that does not react with ITO. The electrochemistry is such that the electrolytic reaction is much less or nonexistent compared to that of Aluminum.

In other embodiments of the present invention, an additional layer of a reflective or an absorptive material 54 is deposited, in this case, over the top surface of the glass layer 26. It should be noted, that the additional layer of reflective or absorptive material 54, would actually be deposited over an anti-reflective coating 56, which is deposited directly on the top surface of the glass layer 26. The additional layer of absorptive material 54 would preferably be formed of a black chromium material, although other absorptive materials could be used. The additional layer of reflective material 54 would probably be formed of an Aluminum, Chrome or other suitable metal or alloy as reflective layer 44. The layer of reflective or absorptive material 54 would preferably be deposited and etched in a process similar to that used in forming the reflective layer 44. Also, as those of ordinary skill in the art will appreciate, a layer(s) of a polysilicon material may be applied to and between the layers formed on the top surface of the glass layer 26.

The microdisplay 16' is preferably constructed as follows. First, the ITO conductive layer(s) 38, 42 and reflective layer(s) 44, 54 are formed on the glass layer 26. In a separate step, the integrated circuit is formed on the silicon substrate layer 28. Then, both the glass layer 26 and the silicon substrate layer 28 are coated with a non-conductive layer, such as a polyimide layer. The polyimide layer is preferably applied to a thickness of approximately 1000 angstroms or less. The glass beads 34 are then sprayed, using an electrostatic spraying or deposition technique, onto either the glass layer 26 or the silicon substrate layer 28. The epoxy ring 30 is placed around the outer edge of the glass layer 26 or silicon substrate layer 28 using a screen printing or jetting process. The glass layer 26 and the silicon substrate layer 28 are then mated. Next, the annulus 32 is filled with the liquid crystal through an opening, which is then plugged. As those of ordinary skill in the art will appreciate, the exact order of the performance of these steps is not critical. For example, the step of applying the epoxy ring 30 could be performed before the step of spraying the glass beads 34.

While the present invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

What is claimed is:

1. A microdisplay device, comprising:
   (a) a matrix of pixels disposed on the top surface of a substrate;
   (b) a layer of transparent material having a top surface and a bottom surface, the bottom surface of said layer of transparent material being disposed adjacent to the top surface of said substrate;
   (c) a seal disposed between the substrate and the layer of transparent material, said seal arranged to form a perimeter around the matrix of pixels;
   (d) an annulus formed by a region bounded by the top surface of the substrate, the bottom surface of the layer of transparent material, and an inside of the perimeter formed by the seal, said annulus being filled with a liquid crystal; and
   (e) a layer of reflective material disposed between the top surface of the substrate and the bottom surface of the layer of transparent material, said layer of reflective material patterned to form a frame around the matrix of pixels.

2. The microdisplay device according to claim 1, further comprising a layer of reflective or absorptive material disposed on the top surface of the layer of transparent material, patterned to form a frame around the matrix of pixels.

3. The microdisplay device according to claim 1, further comprising a layer of conductive material disposed over the bottom surface of the layer of transparent material.

4. The microdisplay device according to claim 3, wherein the layer of reflective material is disposed over the layer of conductive material.

5. The microdisplay device according to claim 3, wherein the layer of conductive material is disposed over the layer of reflective material.

6. The microdisplay device according to claim 5, wherein a layer of polysilicon material is disposed between the layer of conductive material and the layer of reflective material.

7. The microdisplay device according to claim 3, further comprising a plurality of transparent beads disposed in said annulus, which act as spacers to prevent the top surface of the substrate from coming in contact with the layer of conductive material.

8. The microdisplay device according to claim 3, further comprising a barrier metal layer disposed between the layer of reflective material and the layer of conductive material.

9. The microdisplay device according to claim 1, wherein the reflective material comprises a metal selected from the group consisting of aluminum, platinum, chromium, copper, and silver.

10. A microdisplay device, comprising:

(a) a matrix of pixels disposed on a substrate;

(b) a layer of transparent material disposed adjacent to said substrate; and (c) a layer of reflective material disposed between said substrate and said layer of transparent material, said layer of reflective material patterned to form a frame around the matrix of pixels.

11. The microdisplay according to claim 10, further comprising a layer of reflective or absorptive material disposed on the top surface of transparent material, patterned to form a frame around the matrix of pixels.

12. The microdisplay device according to claim 10, further comprising a seal disposed between the layer of transparent material and the substrate, said seal arranged to form a perimeter around the matrix of pixels.

13. The microdisplay device according to claim 12, wherein an annulus is formed in a region bounded by the substrate, the layer of transparent material, and the seal.

14. The microdisplay device according to claim 13, further comprising a liquid crystal, which fills the annulus.

15. The microdisplay device according to claim 14, further comprising a layer of conductive material comprising indium tin oxide, said layer of conductive material disposed over the layer of transparent material.

16. The microdisplay device according to claim 15, further comprising a plurality of transparent beads disposed in said annulus, which act as spacers to prevent the substrate from coming in contact with the layer of conductive material.

17. The microdisplay device according to claim 10, wherein the layer of reflective material comprises a metal selected from the group consisting of aluminum, platinum, chromium, copper, and silver.

18. A microdisplay device, comprising:

(a) a matrix of pixels disposed on a substrate;

(b) a layer of transparent material disposed adjacent to said substrate;

(c) a layer of reflective or absorptive material disposed on a top surface of said layer of transparent material, said layer of reflective material patterned to form a frame around the matrix of pixels; and (d) a layer of reflective material disposed between the layer of transparent material and the substrate, said layer of reflective material patterned to form a frame around the matrix of pixels.

19. The microdisplay device according to claim 18, further comprising a layer of conductive material disposed between a bottom surface of the layer of transparent material and the layer of reflective material.

20. The microdisplay device according to claim 19, further comprising a plurality of layers of conductive material sandwiched between a plurality of layers of polysilicon material.

21. The microdisplay device according to claim 19, wherein the layer of conductive material comprises indium tin oxide.

22. The microdisplay device according to claim 18, wherein the layer of reflective or absorptive material comprises a black chromium material and the layer of reflective material comprises a metal selected from the group consisting of aluminum, platinum, chromium, copper, and silver.

* * * * *